INVENTORS
HERBERT O. NIEDERER
OTTO C. NIEDERER
BY OTTO NIEDERER
Albert Sperry

Dec. 25, 1951  H. O. NIEDERER ET AL  2,579,602
WEIGHT SORTING DEVICE
Filed Dec. 19, 1945  3 Sheets-Sheet 3

INVENTORS
HERBERT O. NIEDERER
OTTO C. NIEDERER
BY OTTO NIEDERER
Albert Sperry

Patented Dec. 25, 1951

2,579,602

UNITED STATES PATENT OFFICE 2,579,602

WEIGHT SORTING DEVICE

Herbert O. Niederer, Otto C. Niederer, and Otto Niederer, Titusville, N. J.

Application December 19, 1945, Serial No. 635,937

6 Claims. (Cl. 209—121)

Our invention relates to mechanism for sorting articles by weight and particularly to constructions for moving articles to and discharging articles from a series of weighing devices.

Mechanisms heretofore provided for sorting articles by weight have been provided with one or more weighing devices to which articles are transferred one after another so that each is weighed in turn. However, the means provided for moving the articles into weighing position and for discharging articles from the weighing devices have frequently imposed strains upon the scales or have subjected the scales to shocks which tend to injure the device or to influence its operation. Prior devices have also been relatively slow and uncertain in the weighing of articles particularly when successive weighing devices are adjusted to respond to small differences in weight or the articles are of borderline weight so that the weighing device responds very slowly. Under such circumstances it has always been necessary to conduct the weighing operations slowly or to adjust or repair the mechanism frequently to keep it operating accurately and satisfactorily.

In accordance with our invention these objections and difficulties in prior art devices are overcome and mechanism provided which reduces the strains and impacts to which weighing devices are subjected and which affords positive and rapid operation for weighing and discharging the articles even when the differences in weight are small or articles are of borderline weight.

These advantages preferably are attained by providing means for raising and lowering the articles so that they are deposited onto and removed from the weighing devices gradually and in substantially a vertical direction. Movement of the articles longitudinally of the mechanism from one weighing device to another or into and out of weighing position is effected without subjecting the devices themselves to transverse or laterally directed strains. Furthemore, ejecting means are provided for positively removing articles from the scales upon predetermined movement of the scale and the operation of the ejecting means is controlled by a timing element which effects an instantaneous weight determination without the delays and uncertainties incident to slow or limited movement of the weighing device under the action of an article of borderline weight. The operation is thus speeded up and made more certain whereas the weighing device itself is protected from injury.

One of the objects of our invention is to increase the speed and accuracy with which articles may be sorted by weight.

Another object of our invention is to provide means for reducing the shocks and strains to which weighing devices are subjected in sorting articles by weight.

A further object of our invention is to provide novel means for moving articles into and out of weighing positions in sorting articles by weight.

Another object of our invention is to provide novel ejecting means for removing articles of predetermined weight from a weighing device.

A further object of our invention is to provide mechanism for effecting an instantaneous weight determination in sorting articles by weight.

These and other objects and features of our invention will appear from the following description thereof in which reference is made to the figures of the accompanying drawings.

In the drawings:

Fig. 5 is a rear view of the weighing device illustrated in Fig. 4 showing typical locking and timing means therefor.

Figure 1:
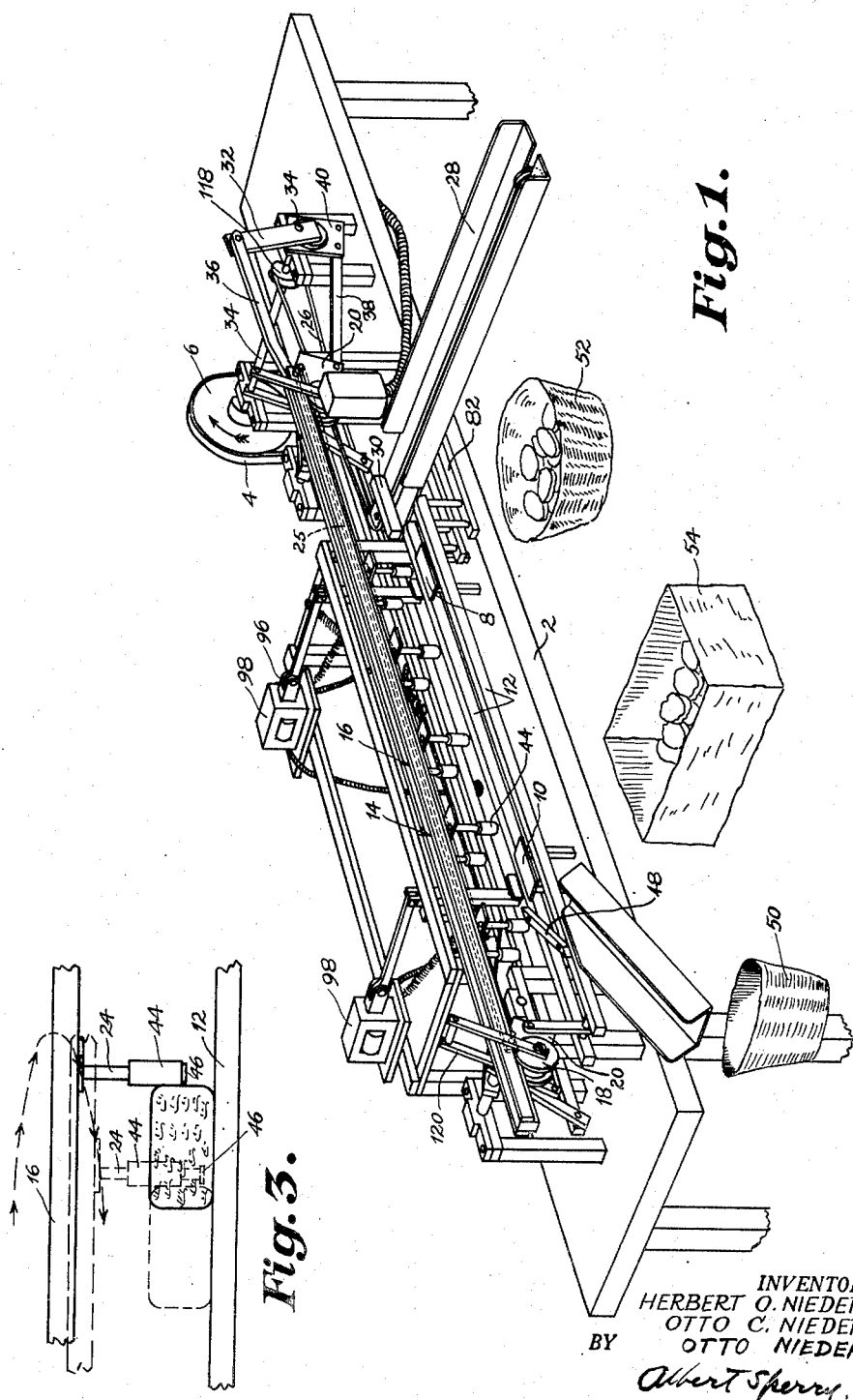
Fig. 1 is a perspective of a typical form of mechanism embodying our invention.

In that form of our invention chosen for purposes of illustration in the figures of the drawings, the mechanism is mounted on a base 2 and is driven by a belt 4 and pulley 6 from a motor and reduction gearing not shown.

Weighing devices 8 and 10 are mounted on the base 2 and the articles to be sorted are passed to each weighing device in succession along a track 12 composed of spaced parallel bars. The articles are advanced one step at a time and from one position to another along the track 12 by means of a conveyor 14 located above the track 12 and composed of a bar 16 supported at its ends on rollers 18 mounted on plates 20 secured to oscillating shafts 22. The bar 16 of the conveyor is provided with pairs of downwardly extending fingers 24 and is movable in an elliptical path so as to cause the fingers 24 to engage the articles on the track 12 and push them along the track during the lower portion of each cycle of movement of the conveyor.

Articles are supplied to the track 12 by a feeding device embodying a belt 26 movable along the bottom of the inclined chute 28 and serving to carry the articles forward in the chute until they are brought to rest in engagement with an abutment 30 in position to be engaged by the pairs of fingers on the conveyor bar. The fingers 24 on the conveyor are spaced apart to engage and center the articles with respect to the bars of the track 12 and to hold the articles in centered position as they are pushed along the track from one weighing device to another.

Figure 3:
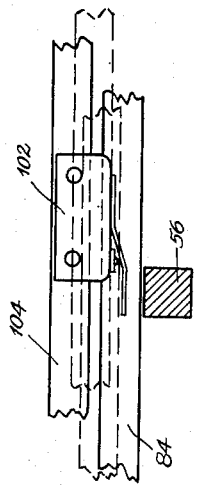
Fig. 3 is a diagrammatic front view of a portion of the conveying means illustrated in Fig. 1.

The conveyor is moved through an elliptical path by reciprocating the bar 16 longitudinally while the rollers 18 are raised and lowered in timed relation. The bar is moved back and forth longitudinally of the mechanism by a crank 32 driven by the shaft 34 to which the pulley 6 is connected. The crank 32 is connected to the bar 16 through the link 36. The rollers 18 which support the bar 16 are moved vertically in timed relation to the longitudinal movement of the bar by oscillation of the plates 20 which carry the rollers 18. The plates 20 are connected together for simultaneous and similar movement by suitable means such as the rigid link 25, and are oscillated through the link 38 connected to the plate 20 at the right hand end of the machine as seen in Fig. 1 and secured to a plate 40 movable by an eccentric 42 on the shaft 36. With this construction the fingers on the conveyor are moved downward and into article engaging position as the conveyor is lowered and travels from right to left as seen in Figs. 1 and 3. However, the fingers are raised upward to disengage the articles and the conveyor is returned to engage successive articles as it moves from left to right. In this way the articles are advanced one step at a time and are accurately positioned with respect to the weighing devices, as the fingers move upward out of engagement with the articles.

The downward movement of the fingers of the conveyor in engaging the articles normally tends to press the articles against the track, but this effect is overcome in accordance with our invention by providing the fingers 24 with sleeves 44 which are shorter than the fingers and are loosely held thereon by the heads 46 as shown in Fig. 3. With this construction the sleeves engage the articles as the conveyor and fingers move downward. However, after engaging the articles the sleeves remain stationary and ride up on the fingers so as to remain in fixed position with respect to the articles on the track 12 while the fingers and articles are moved longitudinally of the track. The fingers therefore do not exert any downward pressure on the articles and friction between the articles and track or fingers is reduced and all danger of displacement, tilting or sticking of the articles to the track or fingers is eliminated even when the articles are rough or irregular in shape or formed of somewhat tacky material such as the preformed rubber stock used in molding rubber articles.

In the construction illustrated two weighing devices are employed and the mechanism is arranged to separate articles into three groups, namely overweight, correct weight, and underweight articles. For this purpose the weighing device 8 nearest the feeding device is adjusted to be actuated only by those articles which are overweight, whereas the weighing device 10 is adjusted to be actuated only by those articles reaching it and which are of correct weight. Those articles which are underweight are passed beyond both weighing devices by means of the conveyor 14 and are discharged from the track 12 by a cam plate 48 so that they will fall into a receptacle 50. The articles discharged from the weighing device 8 are collected in a receptacle 52 while those articles of correct weight and discharged from the weighing device 10 are collected in the receptacle 54.

The weighing devices 8 and 10 are identical in construction and each embodies a balance beam 56 mounted on the pivot pins 58 carried by the supports 60 on base 2. Each balance beam is provided with a scale plate or pan 62 located between the parallel bars of the track 12. The pan 62 is pivotally mounted on the balance beam 56 by means of the lugs 64 and pin 66 and is held in a horizontal position during movement of the balance beam by means of a parallelogram arrangement including the arm 68 which extends downward from the pan 62 and the link 70 which is pivotally connected to the arm 68 and to a cross bar 72 which extends between the supports 60.

The opposite end of the balance beam is provided with an adjusting nut 74 which may be positioned to cause the balance beam to tilt when a predetermined weight is deposited on the pan 62, whereas an adjustable stop member 76 is positioned below the balance beam to be engaged by the beam and limit downward movement of the weighted end thereof so as to hold the pan 62 in a normal raised position for receiving the articles to be weighed.

Figure 2:
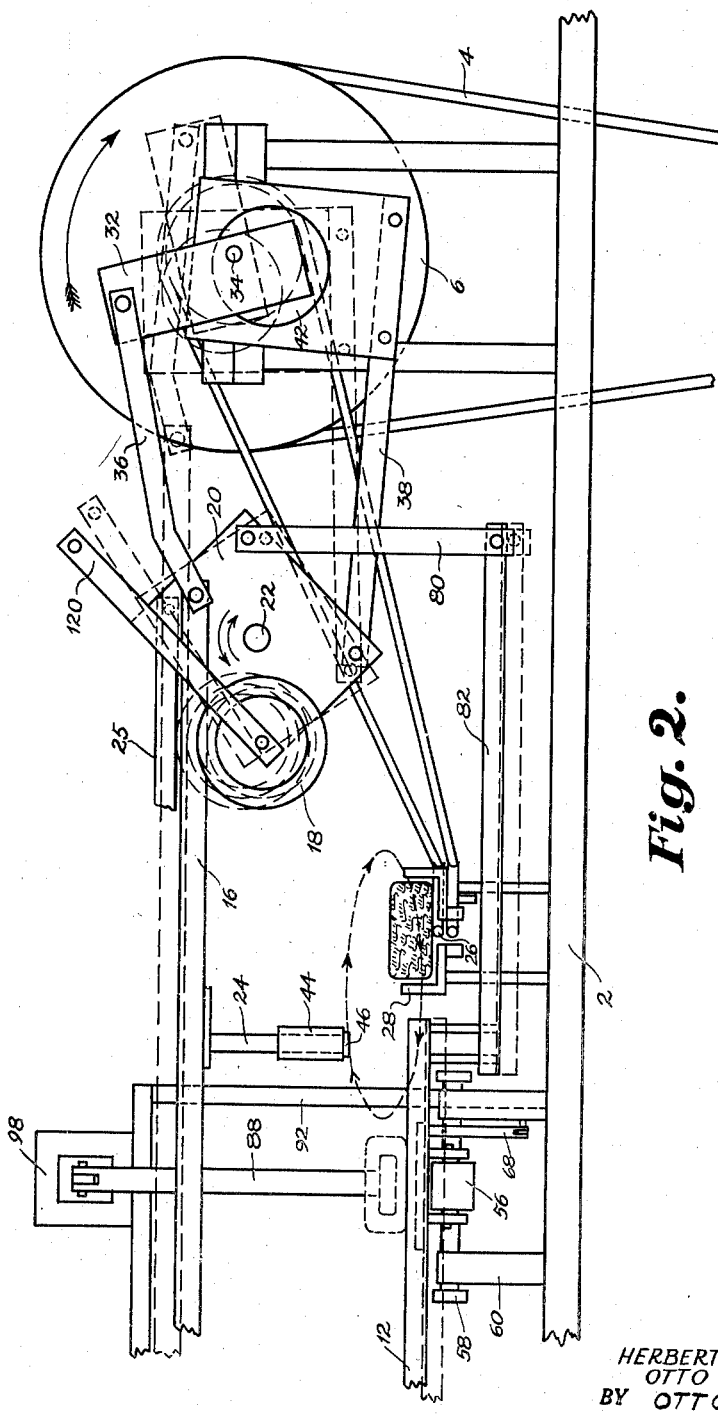
Fig. 2 is an enlarged front elevation of the feeding end of the construction illustrated in Fig. 1.

The track 12 along which the articles are advanced is movable vertically from a raised article supporting position shown in full lines in Fig. 2 in which the articles are supported above the pans 62 during movement of the articles along the tracks to a lowered inactive position shown in dotted lines and in which the articles are deposited on the pans 62 and the track is moved downward far enough to allow free movement of the balance beam and pan through a limited arc. As shown the balance beam 56 is recessed at 78 so that the track may be lowered to deposit an article on the scale pan without engaging or interfering with the movement of the balance beam in weighing the article. On the other hand, when the track is raised the article is lifted from the pan and above the normal raised position thereof so that the article is supported only by the track. Therefore, longitudinal movement of the article does not impose any lateral strains on the scale pan or balance beam, and the operation of advancing the articles from one weighing device to another does not destroy any adjustments or produce any undue wear upon delicate parts of the mechanism. Sensitive and accurate weighing of the articles is thus assured.

The track 12 is raised and lowered in timed relation to the movement of the conveyor by means of the hangers 80 connected to opposite ends of the track and to the oscillating plates 20 by which the rollers 18 supporting the conveyor are carried. As shown the track is formed with a depressed portion 82 which extends beneath the chute 28 of the feeding device. However, the portion of the track along which the articles are moved is horizontal and extends past both of the weighing devices.

Figure 6:
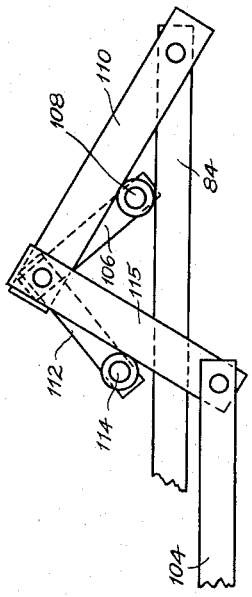
Fig. 6 is a rear view of preferred means for actuating the locking and timing means illustrated in Figs. 1 and 5.

In order to insure the most accurate weighing of articles the balance beams 56 are held stationary as the track is moved downward to deposit articles on the pans 62 and until a stable weighing condition has been established. For this purpose a locking bar 84 extends longitudinally of the mechanism above the weighted ends of the balance beams and is movable vertically from the lowered locking position shown in full lines in Figs. 4, 5 and 6 to a raised weighing position shown in dotted lines in said figures. In the lowered position the locking bar 84 rests upon the balance beams 56 and holds them in engagement with the stop members 76 so that the pans 62 are held in their raised article receiving position. However, after the track 12 has been lowered and articles have been deposited on the pans 62 the locking bar is raised momentarily to permit tilting of the balance beam in response to the weight of the article. If the article is of sufficient weight to tilt the balance beam the article will be removed from the pan 62 and thereafter the locking bar 84 will descend to engage the balance beams and depress them into engagement with the stop members 76 so that the pans 62 will be restored to their normal raised and article receiving positions.

The delays incident to tilting of the balance beam through a relatively large arc necessary to discharge the articles by gravity from the pans 62 would slow up the weighing operation considerably, particularly when an article is of borderline weight, and moves the scale pan only slowly. In accordance with the present invention, an instantaneous weighing of the article is effected, and the article is positively ejected from the scale pan if the balance beam has tilted a predetermined amount at the instant when the weight is to be determined. For this purpose an ejector 86 is located adjacent and above the balance beam, and is carried by a lever 88 pivoted at 90 on the frame 92. The upper end 94 of the lever 88 is connected to the armature 96 of a solenoid 98. The ejector is normally held in a retracted position by means of a spring 100 but upon energizing the solenoid 98 the lever is moved to the dotted line position shown in Fig. 4 to cause the ejector 86 to engage the article being weighed and to positively eject it from the scale pan.

Operation of each ejecting means and solenoid is controlled by a micro-switch 102 or similar means engageable with the balance beam on tilting thereof during the period when the locking bar is raised to release the balance beams for movement. In the construction shown the micro-switches 102 are carried by a timing bar 104 and are located above the balance beams 56. The timing bar and switches are moved downward toward the balance beams and from the full line position of Figs. 4, 5 and 6 to the dotted line position and are then raised again so that the weight determination is effected substantially instantaneously. In the lowered position the micro-switches are so positioned that they will engage and be actuated by balance beams which are tilted through a predetermined arc but will not engage those balance beams which have not been tilted or which have been tilted through an insufficient arc to give a positive indication of the weight of an article.

Figure 4:
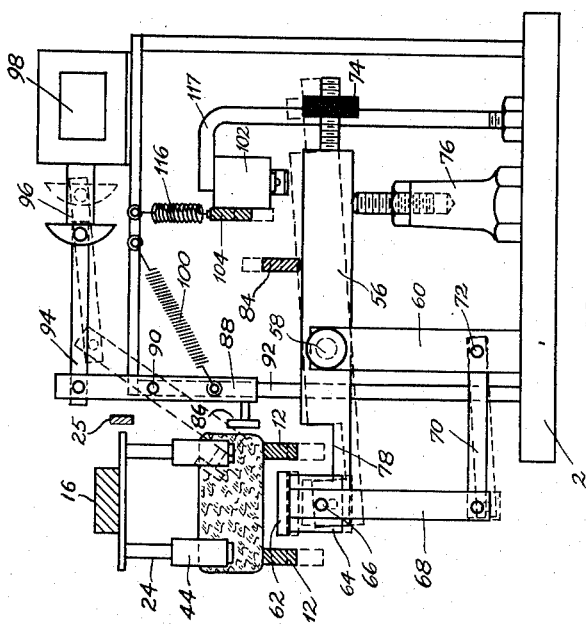
Fig. 4 is a vertical sectional view of a portion of the construction shown in Fig. 1 illustrating the weighing device and ejecting means.

Upon operation of a micro-switch the solenoid associated therewith is actuated to move its armature to the right as seen in Fig. 4, whereupon the lever 88 and ejector 86 are moved to the dotted line position so that an article on the pan 62 is positively removed from the pan. The lever and ejector are then returned immediately to the idle or full line position so that they will not interfere with other operations of the device. As shown the ejector preferably moves upward in engaging an article on the pan 62 so that the article is raised from the pan as it is removed therefrom.

The operation and movement of the locking bar 84 and of the timing bar 104 are controlled by elements secured to oscillating shafts 22. For this purpose an arm 106 is secured to each of the oscillating shafts 22 and is provided with a projection 108 engageable with the links 110 which are freely mounted on the oscillating shafts 22 and connected to the opposite ends of the locking bar 84. Upon oscillation of the shafts 22 the projections 108 on the arms 106 engage the links 110 so that the locking bar 84 is raised from the full line position of Figs. 4, 5 and 6 to the dotted line position to disengage the balance beams 56 and release the weighing devices for operation.

Arms 112 fixedly secured to the oscillating shafts 22 are provided with projections 114 engageable with link 115 rotatably mounted on shaft 22 and connected to the timing bar 104 to move this bar downward so that the micro-switches 102 will be lowered into position to engage those balance beams which have been tilted. The timing bar 104 is normally held in raised position by means of a spring 116 so that the timing bar and micro-switches are depressed only instantaneously and in timed relation to the operation of the locking bar 84. Upward movement of the timing bar is limited by an overhanging stop member 117.

The mechanism shown and described is particularly adapted for use in sorting articles which are rough or irregular or formed of somewhat tacky or plastic compositions, such as the preformed units used in molding rubber products. Such units must be carefully weighed in order to be sure they contain enough rubber to fill the mold and form a perfect article. On the other hand, if the unit contains too much rubber the excess will be extruded from the mold as a flash or fin which is waste material and must be removed by performing further operations on the molded article.

When sorting such preformed units the articles are placed in the chute 28 by an operator and are carried forward by the belt 26 until they engage the abutment 30. The belt is driven from the pulley 118 on the shaft 34 and operates continuously to urge the articles toward the abutment and into position to be engaged by the fingers 24 on the conveyor bar 16.

As the conveyor bar moves downward and toward the left as seen in Figs. 1, 2 and 3, the sleeves 44 on the fingers engage the articles and move them from the abutment 30 onto the track 12 and along the track into position above the pan 62 of the weighing device 8. During this movement the relative movement of the sleeves 44 and fingers 24 eliminates any downward pressure of the fingers which might press the articles against the bars of the track 12 and therefore the articles are advanced readily and without any sticking or tilting of the articles during movement thereof. Moreover, the spaced fingers serve to center the articles with respect to the track so that they will be properly positioned on the pans 62 to insure accurate weighing thereof.

While the articles normally are supplied and moved as described without any difficulty, carelessness on the part of an operator may cause articles to be improperly fed to the abutment 30 so that they are jammed together or stick in being transferred onto the track 12. In such cases the fingers on the conveyor may engage an article and lift the conveyor bar off the rollers 18 by which the bar is supported. Guide members 120 are therefore carried by the plates 20 to cause the bar to drop back in place on the rollers 18 if displaced therefrom.

As the fingers and sleeves move upward out of engagement with the articles after advancing the articles one step along the track 12, the track itself moves downward to deposit the articles on the pans 62 of the weighing devices. During this part of each cycle the locking bar 84 rests on the balance beams 56 and holds them in engagement with the stop members 76 so that the act of depositing the articles on the pans 62 will not cause the balance beam to tilt. However, when the articles have been properly positioned on the pans 62 and have reached a stable condition, the locking bar is raised by operation of the arms 106 on the oscillating shafts 22. The balance beams are then free to move in response to the weight of the articles being weighed.

During the interval while the locking bar is raised the timing bar 104 carrying the micro-switches 102 is depressed for an instant by the arms 112 on oscillating shafts 22. The position of the micro-switches and the movement of the timing bar 104 are such that the switches will only engage and be actuated by those balance beams which have then tilted through a predetermined arc as represented in dotted lines in Fig. 4. If any balance beam has not tilted at all or has tilted insufficiently to be engaged by the micro-switch associated therewith at the instant the timing bar is moved downward, that article will remain on the pan 62 of the balance beam and will be moved on to a new position during the next cycle of operation. However, any micro-switch which is actuated by engaging a tilted balance beam will complete a circuit through the solenoid 98 to energize the same and cause the ejector 86 to swing outward and upward to remove the article from the pan 62 so that it will fall into the proper receptacle. The contact of the micro-switch with the balance beam is only momentary and therefore the solenoid is immediately de-energized so that the ejector is returned promptly to its inactive position by the spring 100.

After the article has been ejected or allowed to remain on the pan 62, depending on its weight, the locking bar again is lowered to hold the balance beams inactive and the track 12 is raised to lift the articles remaining from the pans. The conveyor bar and fingers which have then been moved back toward the right as seen in Fig. 1 are then in position to descend and engage other articles so as to repeat the cycle of operations.

In this way each article in turn is passed through the machine and accurately weighed so as to be sorted out from other articles of different weights. When sorting preformed rubber units for molding purposes those which are of improper weight may be returned and reformed or the overweight units may be trimmed down to proper weight and all of the units actually used for molding will be of such size and weight that proper molding is assured. Similarly when grading or sorting other articles by weight an accurate classification of the articles is assured.

While we have illustrated and described one particular embodiment of our invention it will be apparent that numerous changes and modifications may be made in the form, arrangement and construction of each of the elements of the combination. In view thereof it should be understood that the particular embodiment of our invention herein shown and described is intended to be illustrative only and is not intended to limit the scope of our invention.

We claim:

1. In a weighing device having a balance beam with article receiving means thereon, means for depositing an article on said article receiving means, means movable in timed relation to the operation of said article depositing means for holding said balance beam stationary while an article is being deposited on said article receiving means, ejecting means for removing an article from said article receiving means, electrically actuated means for operating said ejecting means, a switch controlling said electrically actuated means and movable toward said balance beam into position to engage the balance beam when tilted, and means for moving said switch to said position while the balance beam is released for movement.

2. In mechanism for sorting articles wherein the articles are moved from one position to another along a predetermined path, means for supporting the articles during movement thereof, a conveyor in the form of a bar extending longitudinally of said path, means for moving said bar through an elliptical path lying in a plane positioned to pass through articles on said support, spaced members extending from said bar into position to engage and move articles on said support, and article engaging means engaging said spaced members and movable with respect thereto in a direction at right angles to said support whereby articles engaged by said members will be moved thereby along said path without being urged toward or away from said support.

3. In mechanism for sorting articles wherein the articles are moved from one position to another along a predetermined path, means for supporting the articles during movement thereof, a conveyor in the form of a bar extending longitudinally of said path, means for moving said bar through an elliptical path lying in a plane positioned to pass through articles on said support, fingers carried by said bar and projecting therefrom at right angles to said support and into position to move into and out of engagement with articles on said support to advance said articles from one predetermined position to another, and an article engaging member slidably mounted on each of said fingers and positioned to engage an article on said support and to remain in fixed position with respect to said article during elliptical movement of said conveyor.

4. In mechanism for sorting articles by weight embodying a plurality of weighing devices adjusted to respond to progressively decreasing weights, each provided with article receiving means, means for moving articles along a predetermined path to and from said article receiving means comprising a track formed to receive and support the articles to be sorted, said article moving means being movable longitudinally relative to said track to move articles along said track, means for moving said track to a raised position in which the track is located above the article receiving means and to a lowered position in which the track is located below said article receiving means, means for holding said article receiving means in fixed position during movement of said track upward and downward past said article receiving means, conveying means extending substantially parallel to said path, means for moving said conveying means through an elliptical course extending parallel to the path of movement of said articles, article engaging means carried by said conveying means and freely slidable with respect to the conveying means in a direction substantially at right angles to the track, said article engaging means being positioned to move into and out of engagement with articles supported on said track when the track is in said raised position and to move said articles along said track to and from positions above said article receiving means whereby articles engaged by said article engaging means will be moved along said track without being urged toward or away from said track.

5. Mechanism for grading articles by weight comprising a weighing device having article receiving means thereon, an article supporting track extending past said article receiving means, and held against longitudinal movement, said track presenting a substantially smooth longitudinally extending surface formed to receive and support articles to be weighed, conveying means disconnected from said track and movable longitudinally thereof for pushing articles along said smooth surface of track and into position adjacent said article receiving means, and means for lowering said track to a position in which it serves to deposit an article on said article receiving means, and for raising said track to a position wherein it serves to raise an article from said article receiving means and to support it in position to be engaged by said article moving means.

6. Mechanism for grading articles by weight comprising a series of weighing devices each having a balance beam with article receiving means thereon, said balance beams each being adjusted to move in response to an article of different weight and said article receiving means being located along the path of movement of articles to be weighed, means forming a track defining said path of movement, and presenting a substantially smooth longitudinally extending surface formed to receive and support articles to be weighed, means for lowering said track to a position in which it serves to deposit articles on said article receiving means, and for raising said track to a position wherein it serves to raise an article from said article receiving means and to support it in position to be engaged by said article moving means, conveying means disconnected from the track and movable longitudinally thereof for pushing articles along said smooth surface of track when said track is in a raised position, means for holding said balance beams stationary until articles have been deposited on said article receiving means, means for removing an article from said article receiving means, electrically actuated means controlling operation of said article removing means, and means for momentarily closing electrical circuits including those actuating means associated with balance beams which have moved in response to the weight of articles deposited on the article receiving means thereof.

HERBERT O. NIEDERER.
OTTO C. NIEDERER.
OTTO NIEDERER.

REFERENCES CITED

The following references are of record in the file of this patent:

UNITED STATES PATENTS

| Number | Name | Date |
|---|---|---|
| 2,158,023 | Smith | May 9, 1939 |
| 2,279,947 | Keen | Apr. 14, 1942 |
| 2,353,539 | Beach | July 11, 1944 |
| 2,381,035 | Campbell | Aug. 7, 1945 |
| 2,407,664 | Herrold | Sept. 17, 1946 |
| 2,433,575 | Niederer et al. | Dec. 30, 1947 |

FOREIGN PATENTS

| Number | Country | Date |
|---|---|---|
| 420,612 | Great Britain | Dec. 5, 1934 |